(12) United States Patent  
Ozyurt et al.

(10) Patent No.: US 10,895,527 B2  
(45) Date of Patent: Jan. 19, 2021

(54) ILLUMINATION ASSEMBLY FOR UNDERWATER ILLUMINATION

(71) Applicant: BAHCESEHIR UNIVERSITESI, Istanbul (TR)

(72) Inventors: Selcuk Ozyurt, Istanbul (TR); Bulent Aydin, Istanbul (TR); Basak Akdemir, Istanbul (TR); Nil Girgin, Istanbul (TR); Kaan Alper, Istanbul (TR); Suleyman Semsioglu, Istanbul (TR); Ziya Alpay, Istanbul (TR); Sena Karali, Istanbul (TR); Cansin Cokol, Istanbul (TR)

(73) Assignee: BAHCESEHIR UNIVERSITESI, Istanbul (TR)

( * ) Notice: Subject to any disclaimer, the term of this patent is extended or adjusted under 35 U.S.C. 154(b) by 0 days.

(21) Appl. No.: 16/482,245

(22) PCT Filed: Jan. 30, 2018

(86) PCT No.: PCT/TR2018/050030  
§ 371 (c)(1),  
(2) Date: Jul. 30, 2019

(87) PCT Pub. No.: WO2019/009852  
PCT Pub. Date: Jan. 10, 2019

(65) Prior Publication Data  
US 2020/0049621 A1    Feb. 13, 2020

(30) Foreign Application Priority Data

Jan. 31, 2017 (TR) .................................. 2017 01456  
Jan. 16, 2018 (TR) .................................. 2018 00545

(51) Int. Cl.  
*B63C 11/42* (2006.01)  
*G01N 21/25* (2006.01)  
*G01N 21/53* (2006.01)

(52) U.S. Cl.  
CPC ............ *G01N 21/255* (2013.01); *B63C 11/42* (2013.01); *G01N 21/534* (2013.01); *G01N 2201/0627* (2013.01)

(58) Field of Classification Search  
CPC ..... B63C 11/42; G01N 21/255; G01N 21/534  
See application file for complete search history.

(56) References Cited

U.S. PATENT DOCUMENTS 7,692,136 B2 * 4/2010 Blees .................... G01J 3/0278  
250/216  
8,242,476 B2 * 8/2012 Mimeault ............... G01S 17/42  
250/559.29

(Continued)

FOREIGN PATENT DOCUMENTS

DE         103 53 293        6/2005  
DE    102012202930 A1 *  8/2013   ............. H05B 45/20

(Continued)

OTHER PUBLICATIONS

ISR, dated Jan. 30, 2019.

*Primary Examiner* — Lars A Olson  
*Assistant Examiner* — Jovon E Hayes  
(74) *Attorney, Agent, or Firm* — Crose Law LLC; Bradley D. Crose

(57) ABSTRACT

The present invention is an illumination assembly (10) for providing illumination in an underwater medium which at least partially absorbs light. The subject matter illumination assembly (10) is characterized by comprising a light sensing unit (300) having at least one fluid chamber (420), pluralities of fluid intake openings (421), at least one light source (330) positioned inside the fluid chamber (420) and which emits (Continued)

light in at least one first spectrum, at least one photo-diode (310) in a manner facing said light source (330) and which generates signal related to the distribution in said first spectrum and optical intensity of the wavelengths of the light, which is emitted by the light source (330) and which passes through water; at least one LED array (150) which can emit light in the first spectrum; a control unit (120) which determines the operational setting of LED array (150) according to received signal.

4 Claims, 4 Drawing Sheets

(56) References Cited

U.S. PATENT DOCUMENTS

| | | | |
|---|---|---|---|
| 9,772,288 B1* | 9/2017 | Lapota | G01N 21/6486 |
| 2002/0045272 A1* | 4/2002 | McDevitt | C12Q 1/37 |
| | | | 436/518 |
| 2011/0314937 A1* | 12/2011 | Johnson | G01N 15/0272 |
| | | | 73/863.22 |
| 2016/0033328 A1* | 2/2016 | Walters | G01J 3/0208 |
| | | | 356/327 |
| 2020/0049621 A1* | 2/2020 | Ozyurt | G01N 21/534 |

FOREIGN PATENT DOCUMENTS

| | | | |
|---|---|---|---|
| WO | 2007/096814 | | 8/2007 |
| WO | 2007-815996 | * | 1/2013 |

* cited by examiner

ILLUMINATION ASSEMBLY FOR UNDERWATER ILLUMINATION

TECHNICAL FIELD

The present invention relates to illumination assemblies for providing illumination in an underwater medium which at least partially absorbs light.

PRIOR ART

Underwater illumination can be realized by means of white LED or halogen lamps in the present art. Clearness cannot be provided since water has different absorption properties at different depths. In illumination systems where illuminations with variable wavelength are realized, when the system is passed from illumination with a wavelength to illumination with another wavelength, a camera, which captures images of the illuminated medium, cannot sufficiently adapt to this change, and deteriorations and shading occur in the images obtained by said camera in the adaptation process. Moreover, the light, which scatters while passing through water in close-ups, may lead to light burst in the camera.

As a result, because of all of the abovementioned problems, an improvement is required in the related technical field.

BRIEF DESCRIPTION OF THE INVENTION

The present invention relates to an illumination assembly, for eliminating the above mentioned disadvantages and for bringing new advantages to the related technical field.

An object of the present invention is to provide an illumination assembly which prevents occurrence of light burst in the image device which takes the image of the illuminated medium.

Another object of the present invention is to provide an illumination assembly which preserves its orientation while illumination is realized underwater.

In order to realize all of the abovementioned objects and the objects which are to be deducted from the detailed description below, the present invention is an illumination assembly for providing illumination in an underwater medium which at least partially absorbs light. Accordingly, the improvement is that the subject matter illumination assembly is characterized by comprising a light sensing unit having at least one fluid chamber having a hollow body, pluralities of fluid intake openings opened outside from said fluid chamber and providing fluid input to the fluid chamber, at least one light source positioned inside the fluid chamber and which emits light in at least one first spectrum, at least one photo-diode positioned inside the fluid chamber in a manner facing said light source and which generates signal related to the distribution in said first spectrum and optical intensity of the wavelengths of the light, which is emitted by the light source and which passes through water; at least one LED array which is configured to emit light in the first spectrum; at least one LED driver which sets the optical intensity of the light emitted by said LED array and the distribution thereof in the first spectrum; a control unit which determines the operational setting of said LED driver and connected to said photo-diode in a manner receiving said signal as input; said control unit is configured in a manner applying the signal received as input to a function which gives output in inverse to the light intensity and in a manner changing the operational settings of the LED driver in order for the LED array to emit light in accordance with the output of said function; The wavelength absorbed underwater is detected and more intense light is emitted in this wavelength and thus, the taken image becomes clearer. Moreover, the wavelengths which scatter in the illuminated volume are detected and the light intensity in the wavelengths which scatter is reduced or is completely eliminated and the light burst in the camera which takes the image is eliminated.

In another preferred embodiment of the invention, illumination assembly comprises a scatter sensor which faces the volume where the LED array emits light and which generates current in accordance with the wavelength of the scattered rays falling thereon; at least one scatter control circuit arranged in a manner detecting the wavelength where scattering occurs in accordance with the current received from said scatter sensor and in a manner transferring signal to the control unit in order for the LED array to emit light with reduced intensity in the wavelength where scattering occurs.

In another preferred embodiment of the invention, the control unit comprises analog circuit components arranged in a manner defining said function.

In another preferred embodiment of the invention, at least one gyroscope is provided in order to preserve the orientation in at least one axis. Thus, the fixation of the light source and/or the camera connected to the light source is provided in a determined axis, in other words, the orientation is preserved, and it is less affected by the environmental effects.

In another preferred embodiment of the invention, at least one flap is provided which extends from its own body towards outside. Thus, the change of the position in the horizontal and vertical direction due to environmental effects is partially prevented.

In another preferred embodiment of the invention, said flaps comprise pluralities of lower segments connected to each other in a manner sliding onto each other or in a manner closing onto each other.

In another preferred embodiment of the invention, pluralities of fluid chambers are provided; at least one of the light sources is arranged in the form of light in a spectrum which is different from the others and pluralities of light sources are provided where each one is positioned in one each fluid chamber; pluralities of light photo-diodes are provided such that each one is positioned against one each light source and such that current is generated when light is received in the spectrum emitted by the light source positioned against; the LED arrays are arranged such that each one emits light in the spectrum where each light source emits light; pluralities of LED drivers are provided such that each one drives one each LED arrays; pluralities of control units are provided such that each one controls one each LED drivers. Thus, color is selected as needed, and the wavelengths are covered in the wide range.

In another preferred embodiment of the invention, the light sources are arranged in a manner emitting light in at least one of red, green, blue, white, orange, near IR, ultraviolet or yellow spectrums.

In another preferred embodiment of the invention, the LED arrays are arranged in a manner emitting light in at least one of red, green, blue, white, orange, near IR, ultraviolet or yellow spectrums.

In another preferred embodiment of the invention, four LED arrays are provided and they are arranged in a manner emitting light in white, red, orange and yellow spectrums. Thus, an illumination assembly is provided which is suitable for use on land and in fog.

DETAILED DESCRIPTION OF THE INVENTION

In this detailed description, the subject matter illumination assembly (10) is explained with references to examples without forming any restrictive effect only in order to make the subject more understandable.

Figure 1:
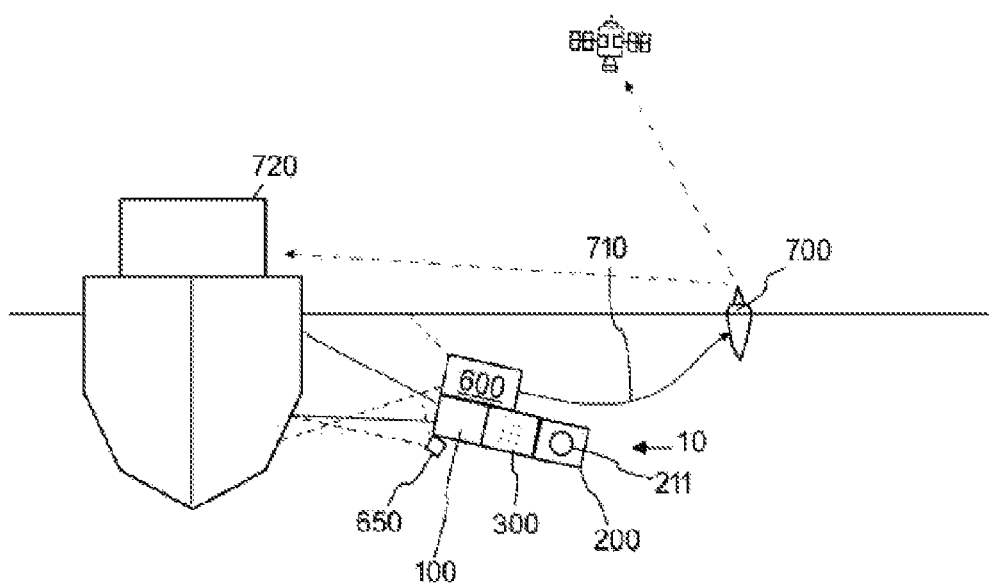
In FIG. 1, the representative view of illumination assembly is given.

In an possible embodiment of the present invention with reference to FIG. 1 is an illumination assembly (10) for providing underwater illumination and for obtaining a clearer image from the illuminated region by means of the camera (650). The illumination assembly (10) essentially comprises a light sensing unit (300) which provides passing of light through water received therein and which measures the wavelengths where the light, passing through the water, is placed at the visible spectrum, near IR spectrum and/or UV spectrum; and an illumination unit (100) which emits light at wavelengths existing at ranges which are idle or which are low in intensity at the spectrum in accordance with the distribution information taken from the light sensing unit (300). Thus the light is applied at the spectrum range absorbed by the water in increased intensity, in the medium where illumination is realized and thereby this range is filled and in this way, a clearer image is obtained. The illumination assembly (10) moreover comprises a scatter detection unit (600) which is oriented to the volume where light is emitted. The scatter detection unit (600) provides detection of the wavelengths realizing scattering in the illuminated volume and provides at least partial reduction of the light transfer in these wavelengths. The illumination assembly (10) comprises an orientation control system (200). The orientation control system (200) provides the illumination assembly (10) to preserve its orientation inside water.

The illumination assembly (10) may also comprise the camera (650) and said camera (650) can be connected to a float (700) by means of a cable (710). Said float (700) can transfer the images, taken by means of radio waves, to a ship (720) or to a satellite.

Figure 2:
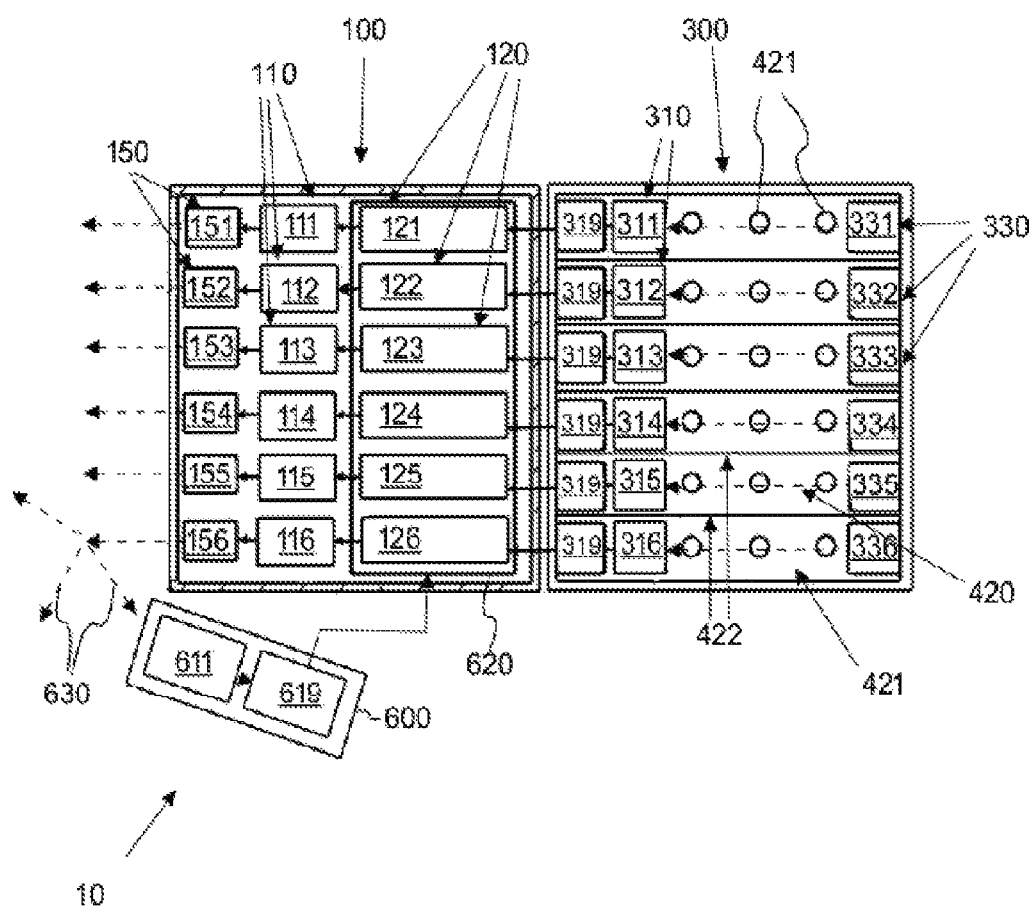
In FIG. 2, a schematic view of the illumination assembly is given.

With reference to FIG. 2, in more details, the light sensing unit (300) comprises fluid chambers (420) which can receive water therein. The fluid chambers (420) comprise pluralities of fluid intake openings (421) in order to receive water therein. When the illumination assembly (10) enters under water, fluid input and fluid output are provided to the fluid chamber (420) through said fluid intake openings (421). The light sensing unit (300) comprises pluralities of light sources (330) inside the fluid chamber (420). The light sensing unit (300) moreover comprises pluralities of photo-diodes (310) positioned inside the fluid chamber (420) where each of said photo-diodes (310) are positioned against a light source (330) in a manner receiving the light emitted from this light source (330) and passing through the water in the chamber. Said photo-diodes (310) generate signal in accordance with the color of the light arriving thereon, in other words, in accordance with the wavelength. The signal generated by said photo-diodes (310) can be amplified by the amplifiers (319).

In more details, the light sensing unit (300) comprises a first light source (331) and a first photo-diode (311) positioned against said first light source (331). In this exemplary embodiment, the first light source (331) comprises a LED which emits red light, and said first photo-diode (311) comprises semiconductors configured to sense red light spectrum.

The light sensing unit (300) comprises a second light source (332) and a second photo-diode (312) positioned against said second light source (332). Said second light source (332) is a LED which emits green light. The second photo-diode (312) is configured to sense the green light spectrum.

The light sensing unit (300) comprises a third light source (333) and a third photo-diode (313) positioned against said third light source (333). Said third light source (333) is a LED which emits blue light. The third photo-diode (313) is configured to sense the blue light spectrum.

The light sensing unit (300) comprises a fourth light source (334) and a fourth photo-diode (314) positioned against said fourth light source (334). Said fourth light source (334) is a LED which emits white light. The fourth photo-diode (314) is configured to sense the white light spectrum.

The light sensing unit (300) comprises a fifth light source (335) and a fifth photo-diode (315) positioned against said fifth light source (335). Said fifth light source (335) is a LED which emits UV (ultraviolet) light. The fifth photo-diode (315) is configured to sense the UV light spectrum.

In this exemplary embodiment, the light detection unit (300) may also comprise a sixth light source (336) and a sixth photo-diode (316) positioned against said sixth light source (336). Said sixth light source (336) has been arranged such that it emits light in the near IR spectrum and such that said sixth light source (336) detects the near IR spectrum. Thus, the image can become clearer in close-ups where scattering is more intense.

Each photo-diode (310) is connected to one each amplifier (119) which operate in a linear manner.

The fluid chamber (420) comprises separation walls (422) provided between the adjacent light source (330) and photo-diode (310) couples, in order for light source (330) and photo-diode (310) couples existing in the fluid chamber (420) not to be affected by the other light source (330) and photo-diode (310) couples. In an exemplary embodiment, each of the fluid chambers (420) can be in tube form in a separate manner from each other.

With reference to FIG. 2, the illumination unit (100) comprises pluralities of LED arrays (150). The LED arrays (150) comprise pluralities of light emitting diodes (LED) which can emit light at different wavelengths. In this exemplary embodiment, the illumination unit (100) comprises at least one first LED array (151) which emits light at the red spectrum, at least one second LED array (152) which emits light at the green spectrum, at least one third LED array (153) which emits light at the blue spectrum, a fourth LED array (154) which emits white light and a fifth LED array (155) which emits light at the ultraviolet (UV) spectrum and a sixth LED array (156) which emits light in the near IR (infrared) spectrum. Here, the mentioned LED arrays (150) comprise power LEDs.

The illumination unit (100) comprises a first control unit (121) connected to the first photo-diode (311). The first control unit (121) is connected to a first LED driver (111). The first control unit (121) detects the optical intensity which decreases as the red light, emitted by first light source (331), is absorbed by the water in accordance with the signal received from the first photo-diode (311). In more details, the first control unit (121) evaluates the distribution and intensity information at the first spectrum of the light taken from the first photo-diode (311) and it provides the first LED array (151) to emit light in accordance with the light intensities of these wavelength ranges. In other words, more intense light is emitted in the wavelengths absorbed by water. In accordance with this decreasing optical intensity, it operates the first LED driver (111) at suitable values and it provides the first LED array (151) to emit light in a manner increasing said decreasing optical intensity.

In a similar manner, the illumination unit (100) comprises a second control unit (122) and a second LED driver (112) providing increase of the optical intensity which decreases at the green spectrum of the second LED array (152) in accordance with the signal received from the second photo-diode (312); a third control unit (123) and a third LED driver (113) providing increase of the optical intensity which decreases at the blue spectrum of the third LED array (153) in accordance with the signal received from the third photo-diode (313); a second control unit (122) and a fourth LED driver (114) providing increase of the optical intensity which decreases at the related spectrum of the fourth LED array (154) in accordance with the signal received from the fourth photo-diode (314); a fifth control unit (125) and a fifth LED driver (115) providing increase of the optical intensity which decreases at the UV spectrum of the fifth LED array (155) in accordance with the signal received from the fifth photo-diode (315); a sixth control unit (126) providing increase of the optical intensity which decreases at the near IR spectrum of the sixth LED array (156) in accordance with the signal received from the sixth photo-diode (316); and a sixth LED driver (116). Here, the mentioned LED drivers (110) can drive the power LED. In a similar manner to the first control unit (121), the other control units (120) provide LED arrays (150) to emit light in a manner proportionally increasing the intensities of wavelengths which have low intensity.

The control units (120) and LED drivers (110) mentioned here comprise analog circuits and components which operate in a linear manner. Analog components which operate in a linear manner have been arranged in a manner defining a function. Therefore, the light intensity is arranged in an increased or decreased manner in accordance with the function structure by means of taking as an input to these functions in accordance with the received signals (current values received from photo-diodes (310)). Thus, the optical intensity in various wavelengths is reinforced and driven in accordance with the attenuation proportion, and the decreasing optical intensity is increased.

The illumination unit (100) comprises a scatter control circuit (620). Said scatter control circuit (620) sets the control units (120) and thus, it arranges the wavelengths or intensities of the light emitted by the LED array (150) connected to each control unit (120).

The scatter detection circuit (620) comprises a scatter sensor (615) which faces the volume through which the light beams, which exit the illumination unit (100), pass. Said scatter sensor (615) generates a signal in accordance with the wavelength and/or intensity of the components of the scattered rays (630) which fall thereon and which occur as a result of a determined effect of the light rays exiting the LED arrays (150). The signal generated by the scatter sensor (615) is at least partially amplified by a scatter amplifier (619) and it is transferred to the scatter control circuit (620). The scatter control circuit (620) detects the wavelength range which scatters to the received signal and accordingly, it arranges the light emitting settings of the LED arrays (150). These light emitting settings are the settings realized on the control units (120) in order to provide emitting light by the LED arrays (150) at a reduced intensity at the detected wavelength range where scattering occurs.

With reference to FIG. 1, the orientation control unit (200) may comprise a gyroscope (211) which accommodates at least one rotation item which has rotational capability in at least one axis in order to preserve the orientation of the body (500) in at least one axis. Thus, the body (500) is fixed in at least one axis.

Figure 3A:
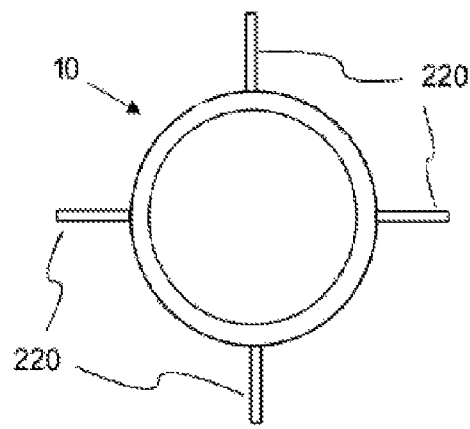
In FIG. 3a, a representative view of a cross section of an embodiment of the illumination assembly is given and in FIG. 3b, the side view of said embodiment of the illumination assembly is given.
Figure 3B:
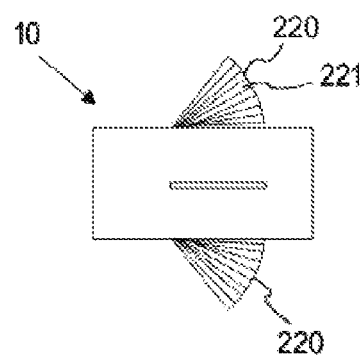

With reference to FIG. 3, in a possible embodiment, pluralities of flaps (220) are provided which protrude outwardly from the body (500) of the illumination assembly (10). In this exemplary embodiment, there are four flaps (220). The flaps (220) are positioned such that there is equal angle in between. The flaps (220) are separated into pluralities of lower segments. The lower segments in plate form are brought together and they form the flap (220). The lower segments are connected to each other such that they are folded onto each other in a hand-fan-like manner or such that they can be slid through each other. Thus, the flaps (220) can be closed and opened manually or automatically. The flaps (220) at least partially restrict the movement of the illumination assembly (10) in the horizontal or vertical axis.

The illumination assembly (10) can moreover comprise a sealed body (500) or sealed bodies (500) which accommodate the abovementioned items therein.

The illumination assembly (10) can be used for detection of damage in submarines, ships (720) and water vehicles, for underwater photographing, for diving and similar water sports.

The operation of this exemplary embodiment of the invention, of which the details are described above, is as follows: When the illumination assembly (10) is taken under water in the region where measurement and illumination will be realized, fluid is filled to the compartments of the fluid chamber (420) through the fluid intake openings (421). The red light, emitted by the first light source (331), passes through the water and it is partially absorbed by the water and it reaches the first photo-diode (311). The first photo-diode (311) generates signal according to the optical intensity of the light arriving thereon. An amplifier (319) amplifies said signal and transmits said signal to the first control unit (121). The first control unit (121) applies the received signal to the function, and in accordance with the function output, the first control unit (121) actuates the first LED driver (111) in order to increase the optical intensity of the first LED array (151).

In a similar manner, the green light, emitted by the second light source (332), passes through the water and it is partially absorbed by the water and it reaches the second photo-diode (312). The second photo-diode (312) generates signal according to the optical intensity of the light arriving thereon. Another amplifier (319) amplifies said signal and transmits said signal to the second control unit (122). The second control unit (122) actuates the second LED driver (112) in order to increase or decrease the optical intensity of the LED array (152) in accordance with the second signal.

Again in a similar manner, the blue light, emitted by the third light source (333), passes through the water and it is partially absorbed by the water and it reaches the third photo-diode (313). The third photo-diode (313) generates signal according to the optical intensity of the light arriving thereon. Another amplifier (319) amplifies said signal and transmits said signal to the third control unit (123). The third control unit (123) actuates the third LED driver (113) in order to increase or decrease the optical intensity of the third LED array (153) in accordance with the signal.

The white light, emitted by the fourth light source (334), passes through the water and it is partially absorbed by the water and it reaches the fourth photo-diode (314). The fourth photo-diode (314) generates signal according to the optical intensity of the light arriving thereon. Another amplifier (319) amplifies said signal and transmits said signal to the fourth control unit (124). The fourth control unit (124) actuates the fourth LED driver (114) in order to increase or decrease the optical intensity of the fourth LED array (154).

The green light, emitted by the fifth light source (335), passes through the water and it is partially absorbed by the water and it reaches the fifth photo-diode (315). The fifth photo-diode (315) generates signal according to the optical intensity of the light arriving thereon. Another amplifier (319) amplifies said signal and transmits said signal to the fifth control unit (125). The fifth control unit (125) actuates the fifth LED driver (115) in order to increase or decrease the optical intensity of the fifth LED array (155).

The IR light, emitted by the sixth light source (336), passes through the water and it is partially absorbed by the water and it reaches the sixth photo-diode (316). The sixth photo-diode (316) generates signal according to the optical intensity of the light arriving thereon. Another amplifier (319) amplifies said signal and transmits said signal to the sixth control unit (126). The sixth control unit (126) actuates the sixth LED driver (115) in order to increase or decrease the optical intensity of the sixth LED array (156) in accordance with the signal.

Thus, in order to provide illumination in a clearer manner even if light transmittance changes depending on the depth and structure of water, an illumination is realized in order to provide image taking in a clearer manner by means of increasing or decreasing light intensities according to the transmittance. As analog elements, which operate in a linear manner, are used, the shading which occurs in the image of the camera (650), which captures images of the illuminated region, is reduced during wavelength alterations.

Since the scattering light rays make difficult the correct image taking of the camera (650), a signal is generated in accordance with the wavelengths of the scattered rays (630) falling onto the scatter sensor (615) and this signal is amplified and the scattering is transferred to the control circuit (620). The scatter control circuit (620) detects the wavelengths where scattering occurs and it controls the control units (120), which control the LED arrays (150) which emit light in this wavelength, in a manner providing reduction of the light intensity in these wavelengths. The scatter sensor (615) can accommodate pluralities of photo-diodes (310) arranged in a manner sensing light at different wavelengths.

A face mask can be provided for wearing of the diver who takes image underwater, and said face mask can realize acoustic communication with the float (700).

Figure 4:
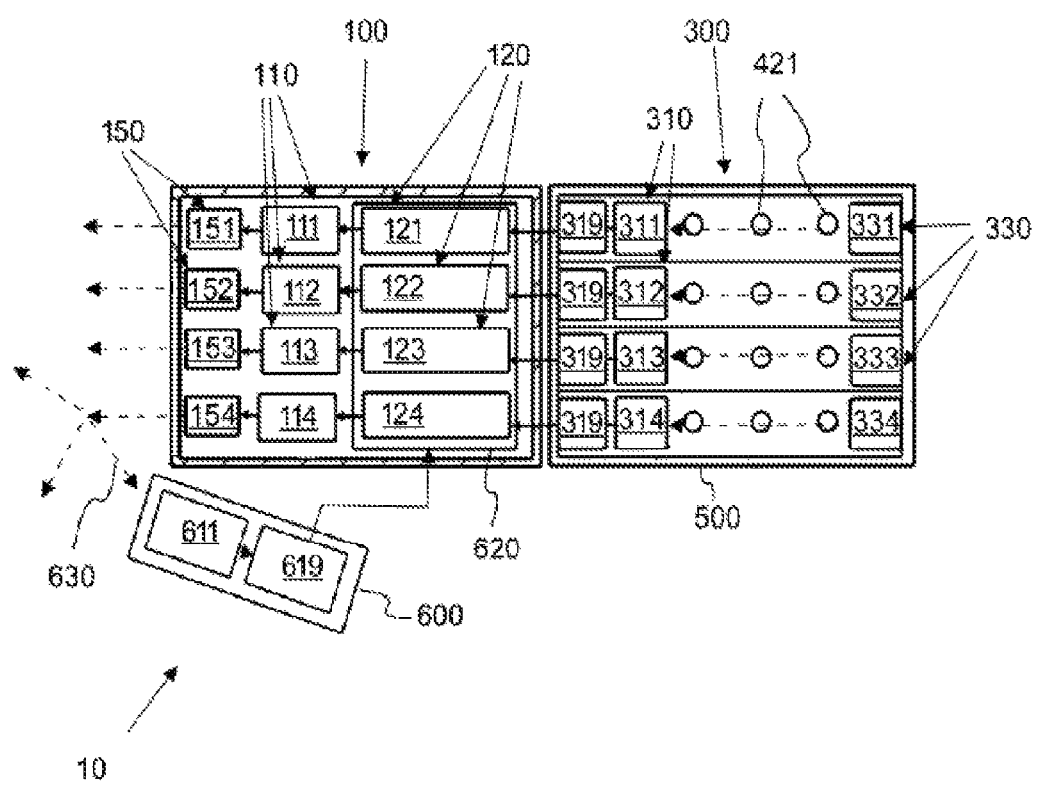
In FIG. 4, the schematic view of an embodiment of the illumination assembly which is suitable for use on land is given.

With reference to FIG. 4, in a possible embodiment, the illumination assembly (10) is arranged in a manner fulfilling light emitting function on land and image taking function. In this embodiment, the illumination unit (100) comprises the first light source (331), the second light source (332), the third light source (333) and the fourth light source (334). The first light source (331) has been arranged in a manner emitting white light and the second light source (332) arranged in a manner emitting red light and the third light source (333) arranged in a manner emitting orange light and the fourth light source (334) arranged in a manner emitting yellow light. The first photo-diode (311) has been positioned in a manner receiving light from the first light source (331); the second photo-diode (312) positioned in a manner receiving light from the second light source (332); the third photo-diode (313) positioned in a manner receiving light from the third light source (333); the fourth photo-diode (314) positioned in a manner receiving light from the fourth light source (334) and they have been arranged in a manner able to sense the light emitted from the light sources (330) provided mutually. In a similar manner to the first embodiment, the photo-diodes (310) are connected to one each amplifiers (319) and said amplifiers (319) are connected to one each control units (120) and the control units (120) are connected to one each LED drivers (110). The LED drivers (110) are connected to LED arrays (150) arranged in a manner emitting light with type sensed by the light sensor (615) connected to the LED drivers (110). The first LED array (151) has been arranged in a manner emitting white light, the second LED array (152) arranged in a manner emitting red light, the third LED array (153) in a manner emitting orange light and the fourth LED array (154) arranged in a manner emitting yellow light.

The scatter detection unit (600) is provided in a similar manner to the embodiment in FIG. 2. The scatter detection unit (600) detects the scattered rays (630) and it controls the control units (120) in a manner providing at least partially reducing the light intensity transferred in these wavelengths. Thus, in cases where the image conditions are impaired, it can be used in devices like automobile headlights, fog lights and medical devices. It emits more light in the wavelength absorbed by the medium thereof and it decreases the light intensity emitted in the wavelength where scattering occurs. It provides optimizing of the image. In an exemplary embodiment which is suitable for on land use, the illumination assembly (10) can be provided by removing the light sensing unit (300) (not illustrated in the figure). In this exemplary embodiment, the light sensing unit (300) has been arranged in a fixable/removable manner (not illustrated in the figure).

The light sources (330) and the LED arrays (150) have been arranged in a manner functioning in all wavelengths.

The protection scope of the present invention is set forth in the annexed Claims and cannot be restricted to the illustrative disclosures given above, under the detailed description. It is because a person skilled in the relevant art can obviously produce similar embodiments under the light of the foregoing disclosures, without departing from the main principles of the present invention.

REFERENCE NUMBERS

10 Illumination assembly
100 Illumination unit
110 LED driver
111 First LED driver
112 Second LED driver
113 Third LED driver
114 Fourth LED driver
115 Fifth LED driver
116 Sixth LED driver 120 Control unit
121 First control unit
122 Second control unit
123 Third control unit
124 Fourth control unit
125 Fifth control unit
126 Sixth control unit
150 LED array
151 First LED array
152 Second LED array
153 Third LED array
154 Fourth LED array
155 Fifth LED array
156 Sixth LED array
200 Orientation control unit
211 Gyroscope
220 Flap
221 Lower segment
300 Light sensing unit
310 Photo-diode
311 First photo-diode
312 Second photo-diode
313 Third photo-diode
314 Fourth photo-diode
315 Fifth photo-diode
316 Sixth photo-diode
319 Amplifier
330 Light source
331 First light source
332 Second light source
333 Third light source
334 Fourth light source
335 Fifth light source
336 Sixth light source
420 Fluid chamber
421 Fluid intake opening
422 Separation wall
500 Body
600 Scatter detection unit
611 Scatter sensor
619 Scatter amplifier
620 Scatter control circuit
630 Scattered ray
650 Camera
700 Float
710 Cable
720 Ship

The invention claimed is:

1. An illumination assembly (10) for providing illumination in an underwater medium which at least partially absorbs light, characterized by comprising
a light sensing unit (300) having at least one fluid chamber (420) having a hollow body (500), pluralities of fluid intake openings (421) opened outside from said fluid chamber (420) and providing fluid input to the fluid chamber (420), at least one light source (330) positioned inside the fluid chamber (420) and which emits light in at least one first spectrum, at least one photo-diode (310) positioned inside the fluid chamber (420) in a manner facing said light source (330) and which generates signal related to the distribution in said first spectrum and optical intensity of the wavelengths of the light, which is emitted by the light source (330) and which passes through water;
at least one LED array (150) which can emit light in the first spectrum; at least one LED driver (110) which sets the optical intensity of the light emitted by said LED array (150) and the distribution thereof in the first spectrum; a control unit (120) which determines the operational setting of said LED driver (110) and connected to said photo-diode (310) in a manner receiving said signal as input;
said control unit (120) is configured in a manner applying the signal received as input to a function which gives output in proportion to the light intensity and in a manner changing the operational settings of the LED driver (110) in order for the LED array (150) to emit light in accordance with the output of said function;
further comprising
a scatter sensor (615) which faces the volume where the LED array (150) emits light and which generates current in accordance with the wavelength of the scattered rays falling thereon;
at least one scatter control circuit (620) arranged in a manner detecting the wavelength where scattering occurs in accordance with the current received from said scatter sensor (615) and in a manner transferring signal to the control unit (120) in order for the LED array (150) to emit light with reduced intensity in the wavelength where scattering occurs.

2. An illumination assembly (10) for providing illumination in an underwater medium which at least partially absorbs light, characterized by comprising
a light sensing unit (300) having at least one fluid chamber (420) having a hollow body (500), pluralities of fluid intake openings (421) opened outside from said fluid chamber (420) and providing fluid input to the fluid chamber (420), at least one light source (330) positioned inside the fluid chamber (420) and which emits light in at least one first spectrum, at least one photo-diode (310) positioned inside the fluid chamber (420) in a manner facing said light source (330) and which generates signal related to the distribution in said first spectrum and optical intensity of the wavelengths of the light, which is emitted by the light source (330) and which passes through water;
at least one LED array (150) which can emit light in the first spectrum; at least one LED driver (110) which sets the optical intensity of the light emitted by said LED array (150) and the distribution thereof in the first spectrum; a control unit (120) which determines the operational setting of said LED driver (110) and connected to said photo-diode (310) in a manner receiving said signal as input;
said control unit (120) is configured in a manner applying the signal received as input to a function which gives output in proportion to the light intensity and in a manner changing the operational settings of the LED driver (110) in order for the LED array (150) to emit light in accordance with the output of said function;
further comprising
at least one flap (220) is provided which extends from its own body towards outside.

3. An illumination assembly (10) according to claim 2, wherein said flaps (220) comprise pluralities of lower segments (221) connected to each other in a manner sliding onto each other or in a manner closing onto each other.

4. An illumination assembly (10) for providing illumination in an underwater medium which at least partially absorbs light, characterized by comprising
a light sensing unit (300) having at least one fluid chamber (420) having a hollow body (500), pluralities of fluid intake openings (421) opened outside from said fluid chamber (420) and providing fluid input to the fluid chamber (420), at least one light source (330) positioned inside the fluid chamber (420) and which emits light in at least one first spectrum, at least one photo-diode (310) positioned inside the fluid chamber (420) in a manner facing said light source (330) and which generates signal related to the distribution in said first spectrum and optical intensity of the wavelengths of the light, which is emitted by the light source (330) and which passes through water;

at least one LED array (150) which can emit light in the first spectrum; at least one LED driver (110) which sets the optical intensity of the light emitted by said LED array (150) and the distribution thereof in the first spectrum; a control unit (120) which determines the operational setting of said LED driver (110) and connected to said photo-diode (310) in a manner receiving said signal as input;

said control unit (120) is configured in a manner applying the signal received as input to a function which gives output in proportion to the light intensity and in a manner changing the operational settings of the LED driver (110) in order for the LED array (150) to emit light in accordance with the output of said function;

further comprising four LED arrays (150) and LED arrays (150) arranged in a manner emitting light in white, red, orange and yellow spectrums.

\* \* \* \* \*